United States Patent
Wyman (10) Patent No.: US 9,976,932 B2
(45) Date of Patent: May 22, 2018

(54) METHOD FOR OPERATING A PLURALITY OF MEASURING MACHINES AND APPARATUS COMPRISING MULTIPLE MEASURING MACHINES

(71) Applicant: KlingeInberg AG, Zurich (CH)

(72) Inventor: Hastings Wyman, Saline, MI (US)

(73) Assignee: KLINGELNBERG AG (DE)

( * ) Notice: Subject to any disclaimer, the term of this patent is extended or adjusted under 35 U.S.C. 154(b) by 127 days.

(21) Appl. No.: 15/170,547

(22) Filed: Jun. 1, 2016

(65) Prior Publication Data

US 2016/0356671 A1    Dec. 8, 2016

(30) Foreign Application Priority Data

Jun. 3, 2015  (DE) .................. 10 2015 108 851

(51) Int. Cl.
G01M 13/02    (2006.01)

(52) U.S. Cl.
CPC ........... G01M 13/021 (2013.01); *Y02P 90/02* (2015.11)

(58) Field of Classification Search
None
See application file for complete search history.

(56) References Cited

U.S. PATENT DOCUMENTS

| | | | | |
|---|---|---|---|---|
| 5,271,271 A * | 12/1993 | Frazier | ........... | G01M 13/021 33/501.13 |
| 5,852,793 A * | 12/1998 | Board | ........... | G01H 1/003 702/183 |
| 6,230,575 B1 * | 5/2001 | Berger | ........... | F16H 29/08 74/53 |
| 2007/0101818 A1 * | 5/2007 | Kabrich | ........... | F16H 61/061 74/335 |
| 2007/0277610 A1 * | 12/2007 | Landvogt | ........... | G01M 13/021 73/587 |
| 2008/0028847 A1 * | 2/2008 | Baruchello | ........... | G01M 13/021 73/162 |
| 2008/0113592 A1 * | 5/2008 | Stadtfeld | ........... | B23F 19/025 451/47 |
| 2009/0319077 A1 | 12/2009 | Cameron | | |
| 2014/0123510 A1 * | 5/2014 | Baruchello | ........... | G01M 13/021 33/520 |
| 2015/0013449 A1 * | 1/2015 | Murata | ........... | G01B 21/20 73/162 |

* cited by examiner

*Primary Examiner* — Andre Allen
(74) *Attorney, Agent, or Firm* — McCarter & English, LLP (57) ABSTRACT

A method for operating a plurality of measuring machines (20.1, 20.2), wherein measuring machines (20.1, 20.2) of the same type are concerned which are designed for the measurement of same parts (4), having the following steps: —measuring a first quantity of same parts (4) in a first measuring machine (20.1); —measuring a second quantity of same parts in a second measuring machine (20.2); —performing a comparison process, wherein within the scope of said comparison process at least one value (W1) of the first quantity is correlated with at least one respective value (W2) of the second quantity in order to determine therefrom; and deviations between measurements of the first measuring machine (20.1) and measurements of the second measuring machine (20.2).

14 Claims, 4 Drawing Sheets

METHOD FOR OPERATING A PLURALITY OF MEASURING MACHINES AND APPARATUS COMPRISING MULTIPLE MEASURING MACHINES

This application claims priority under 35 U.S.C. §§ 119 (a)-(d) to European application no. DE102015108851.7 filed Jun. 3, 2015, which is hereby expressly incorporated by reference as part of the present disclosure.

FIELD OF THE INVENTION

The invention relates to methods for operating a plurality of measuring machines and apparatuses including at least two measuring machines.

BACKGROUND

Productivity and precision are important aspects of machine tools. In view of sharply increased demands concerning production precision, process monitoring and workpiece testing are also further gaining in importance. Questions of profitability are also concerned in addition to precision.

It is a common approach to monitor a machine and the production process occurring therein in order to allow intervention in the case of an error, for example. There are processing machines for the production of gearwheels, for example, which are connected to a measuring machine in such a way that workpieces machined on the processing machine are transferred automatically to the measuring machine. The measuring machine then measures or tests the workpiece and can provide feedback to the processing machine in the case of deviations for example. This approach is known under the term closed-loop.

SUMMARY OF THE INVENTION

There is a need for improvement over the prior art, especially in the series production of same parts.

The following object is raised in view of the above statements. It is intended to find an approach which allows further improving the efficiency of machines, wherein machines are concerned in particular which are used in connection with the production or machining of gearwheels.

An entire apparatus may comprise means for intra-machine communication, which allows correlating current production specifications of individual measuring machines of the same type to each other (e.g., of measuring machines which are part of a machine series or machine cell, or a handling group) in order to enable automatically recognizing differences in the measurement, determination, performance or behavior in the measuring machines for example. These differences will be designated here as differences in results.

The invention may be used in such gear-measuring machines which are at the end of a production chain. It is thus possible virtually in the last instance to prevent that workpieces are supplied to customers which are not in conformity.

Depending on the embodiment, the measuring machines of the same type exchange information among each other in order to enable a comparison of the results in the direct exchange of the measuring machines among each other, or a central module is used (referred to herein as a comparison module) which receives information from all measuring machines of the same type and links them to each other. In the first case, one of the measuring machines of the same type can assume the function of a master, whereas the other measuring machines of the same type act as slaves. In this case, the measuring machine used as a master is equipped with a comparison module (e.g., in form of software which is loaded into the controller of said measuring machine).

Certain embodiments can be structured in a modular system. This allows the installation of respective software modules in order to adjust the respective measuring machines to the measurement or determination tasks. Consequently, the gear-measuring machines can be equipped with a comparison module for example which allows the communication of the measuring machines among each other and allows the correlation of the respective information in order to thus reveal differences in results.

Some embodiments can be provided with an analytic software in order to allow further evaluations to be carried out. Such an analytical software can determine error trends in connection with the series production of same parts for example. As a result, it can be intervened in production if a measuring machine rejects fewer same parts than other measuring machines, which may be caused by an error in said measuring machine, for example.

Certain embodiments can be provided with a recording software in order to allow records to be taken (e.g. in form of daily reports). Such a record can also be relevant with respect to quality control.

Some embodiments may be used in connection with so-called acceptance and rejection measurements which are implemented in the measuring machines. The aforementioned comparison module is superordinate or subordinate to said acceptance and rejection measurements.

BRIEF DESCRIPTION OF THE DRAWINGS

Further details and advantages of the invention will be described below with reference to exemplary embodiments and with respect to the drawings, wherein.

DETAILED DESCRIPTION OF EMBODIMENTS

Terms which are also used in relevant publications and patents are used in connection with the present description as will be understood by those of ordinary skill in the art.

Notice must be taken, however, that the use of these terms shall only be used for the purpose of better understanding. The inventive concepts and the scope of protection of the claims shall not be limited in their interpretation by the specific choice of the terms. The invention can easily be transferred to other concept systems and/or specialized fields. In other specialized fields the terms shall apply analogously.

The term "gear-measuring machine" shall be used below for measuring machines, measuring centers, test apparatuses, testers, bevel gear testers, single-flank roller testing devices, two-flank roller testing devices, run testing machines and testing devices which can be used for measuring and/or determining one or several parameters of a gearing.

Machines may be implemented as gear-measuring machines within the terms of the invention which are formed, for example,
- to determine the installation position of gearwheels/pairs of gearwheels and/or
- to determine one or several dimensions (e.g. the tooth width) of a gearwheel (also known as geometric testing of gearings) and/or
- to determine the running properties of gearwheels/pairs of gearwheels and/or
- to determine the carrying capability of gearwheels and/or
- to determine the topography (e.g. corrugation of tooth flanks) of gearwheels, to name a few examples.

The term "machines of the same type" is used below. This concerns both machines which are mechanically and/or electronically identical and also machines whose relevant elements/components are equal or similar.

The term "same parts" is used below. These are workpieces which are identical (if ignoring the production-induced deviations/tolerances). In particular, gearwheels or sets of gearwheels (e.g. 9 inch gearwheels with a gear ratio of 3.373) are concerned which are identical.

Figure 1:
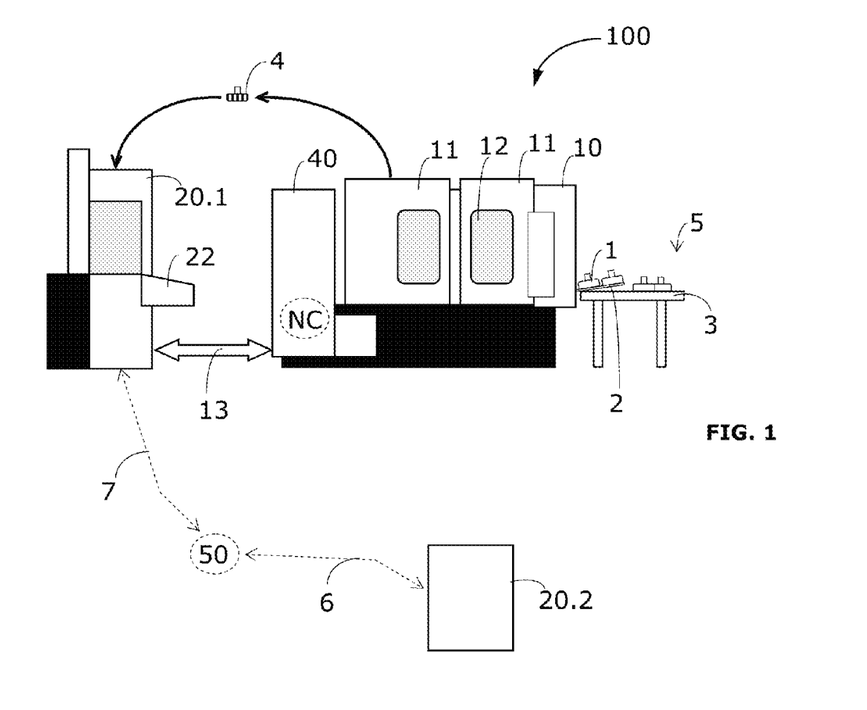
FIG. 1 shows a schematic front view of a gear-cutting machine which cooperates with a measuring machine in which methods in accordance with embodiments of the invention can be used.

FIG. 1 shows a schematic view of a first apparatus 100. The apparatus 100 comprises a gear-cutting machine 10 on the one hand and a gear-measuring machine 20 on the other hand. The gear-cutting machine 10 and the gear-measuring machine 20 are coupled to each other, as indicated by the double-ended arrow 13. The term coupling is used in order to indicate that the gear-cutting machine 10 and the gear-measuring machine 20 are coupled to each other at least with respect to communication (i.e., for data exchange). This coupling with respect to communication requires that the gear-cutting machine 10 and the gear-measuring machine 20 "understand" the same or a compatible communication protocol and both follow certain conventions regarding data exchange. The coupling with respect to communication of a gear-measuring machine 20 to a gear-cutting machine 10 allows the automatic calculation and feedback of corrective data to the gear-cutting machine 10 for example. This contributes to production stability and optimal component quality of the workpieces 4.

Figure 2A:
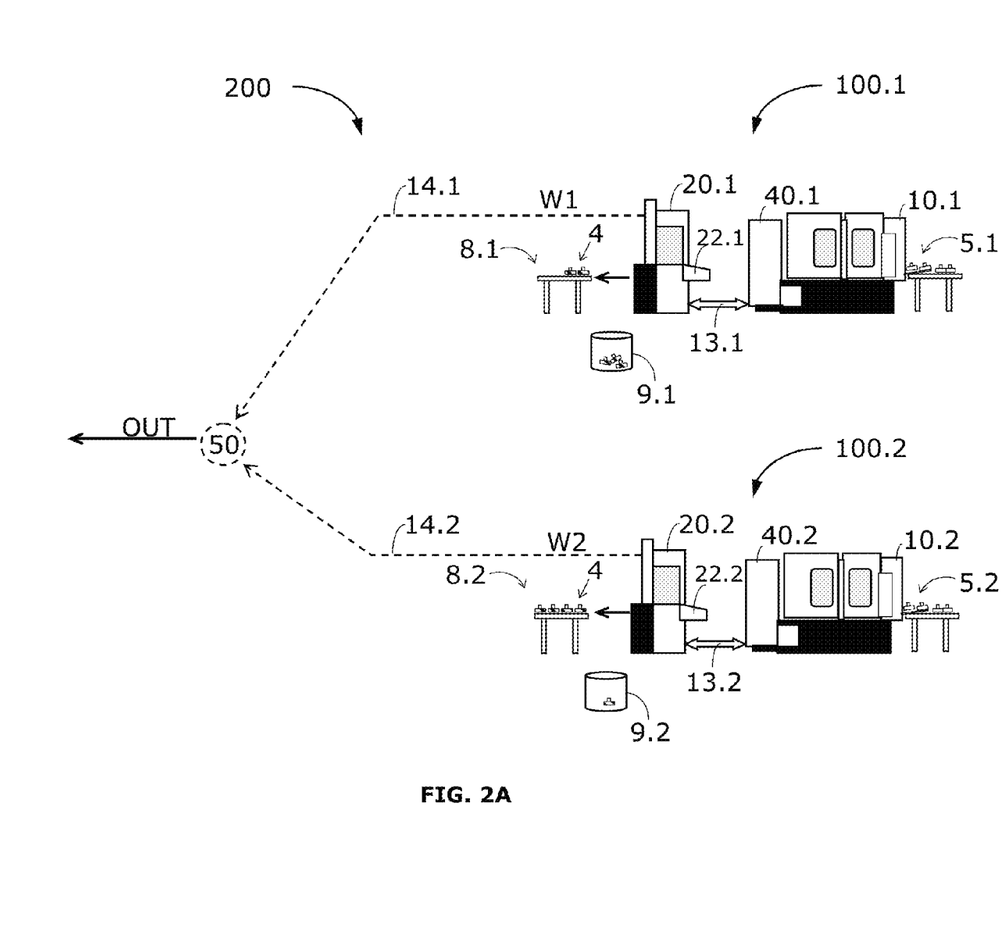
FIG. 2A shows a schematic front view of an entire apparatus with two handling groups, wherein each of the handling groups comprises a gear-cutting machine and a measuring machine, and wherein methods in accordance with embodiments of the invention are realized in a comparison module (each gear-cutting machine is assigned in this case to a measuring machine)
Figure 2B:
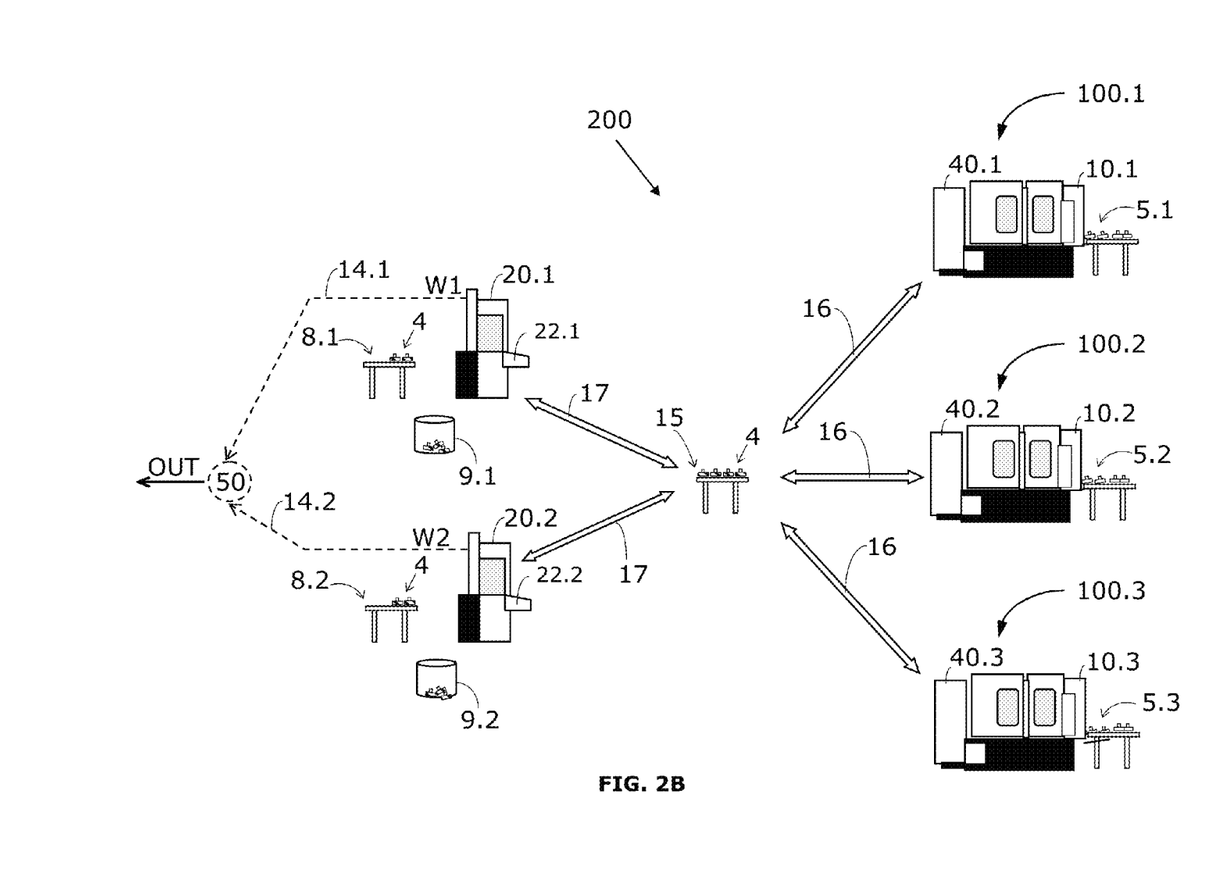
FIG. 2B shows a schematic front view of a further entire apparatus which comprises three gear-cutting machines and two measuring machines, and wherein methods in accordance with embodiments of the invention are realized in a comparison module (there is no direct assignment in this case between the gear-cutting machines and the measuring machines)

In the illustration in FIG. 1, the gear-cutting machine 10 is directly assigned to a measuring machine 20 (designated here as the first gear-measuring machine 20.1). A similar approach is also shown in FIG. 2A. A further embodiment is shown in FIG. 2B, where there is no direct assignment between the gear-cutting machines 10.1, 10.2, 10.3 and the measuring machines 20.1, 20.2.

Further details of the apparatus 100 which are to be understood in an exemplary way are explained below. The gear-cutting machine 10 is equipped in the illustrated example with a feed apparatus 5. The feed apparatus 5 is used for supplying the gear-cutting machine 10 with blanks 1, which are then machined in the gear-cutting machine 10. In the illustrated example, a total of four blanks 1 can be seen to the right of the gear-cutting machine 10. At the illustrated time, two blanks 1 are transferred via a conveying system 2 into the interior of the gear-cutting machine 10. Two further blanks 1 are ready on a table 3. The actual machining chamber of the gear-cutting machine 10 is located behind doors 11, for example, which can be provided with inspection windows 12.

The machined blanks 1, which are designated as workpieces 4 after machining, are transferred by the gear-cutting machine 10 directly (see FIG. 2A) or indirectly (see FIG. 2B) to the gear-measuring machine 20.1. This can occur either manually or in an automated manner (e.g., by means of a robot or a conveying system). The gear-measuring machine 20.1 can be used for determining one or several sizes of a gearing of the machined workpieces 4 in order to check whether the workpiece 4 corresponds to specifications. The gear-measuring machine 20.1 can comprise a measuring sensor for this purpose, for example.

A so-called comparison process my be used, which process is described below in closer detail by reference to examples. The comparison process can be implemented, e.g., in a comparison module 50.

Such a comparison module 50 can be a part of the measuring controller 22 of the measuring machine 20.1, for example. The comparison module 50 can also be arranged externally, as indicated in FIG. 1.

The comparison module 50 can be formed for the purpose, for example
- to take part in carrying out comparison communication, and/or
- to carry out a comparison process, and/or
- to take part in carrying out a comparison process, and/or
- to carry out the performance of a comparison process (as a master).

FIG. 1 shows a superordinate comparison module 50, which is connected via a (bidirectional) communication connection 7 to the gear-measuring machine 20.1. The comparison module 50 can be connected to at least one further gear-measuring machine 20.2 of the same type via respective further (bidirectional) communication connections 6, as schematically shown in FIG. 1.

The term "coupling" means that the gear-cutting machine 10 and the gear-measuring machine 20.1 are mechanically connected to each other or can be completely integrated. The workpieces 4 can also be transferred from the gear-cutting machine 10 to the gear-measuring machine 20.1 via such an optional mechanical connection, as schematically indicated in FIG. 1 by two arrows. A robot arm or a conveying system can be used, for example, as a mechanical connection.

The details of an exemplary method are described by reference to FIGS. 2A and 2B. FIG. 2A shows an entire apparatus 200 with two arrangements (also known as handling groups), which each comprise a machine 10 and a gear-measuring machine 20. FIG. 2B shows an entire apparatus 200 with three machines 10 and with two gear-measuring machines 20.

Reference is hereby made to the description of FIG. 1. The elements of the entire apparatus 200 are provided with 1, 2 or 3 in the index in order to allow distinguishing the individual machines of FIGS. 2A and 2B.

The handling groups of FIG. 2A each comprise a finished-products store 8.1 and 8.2. The finished workpieces 4 which are accepted by the machine 20.1 are stored in the finished-products store 8.1. The finished workpieces 4 which are accepted by the machine 20.2 are stored in the finished-products store 8.2. Since not every workpiece 4 meets the predetermined criteria, unsuitable (non-conforming) workpieces 4 are sorted out. In FIG. 2A, each handling group comprises a container (or a suitable deposit) 9.1 and 9.2 which is used for accommodating rejected workpieces 4. In the schematic example of FIG. 2A, only two workpieces are situated in the finished-products store 8.1, whereas four workpieces are situated in the finished-products store 8.2. Three workpieces are situated on the other hand in the first reject container 9.1 and only one workpiece is situated in the second reject container 9.2. The upper handling group of the entire apparatus 200 thus produces more rejects than the bottom handling group.

Embodiments of the invention provide a method which is formed for operating and/or monitoring gear-measuring machines 20.1, 20.2. They concern machines 20.1, 20.2 of the same type, which are formed for measuring same parts (workpieces 4). The method comprises the following steps:

A1. Measuring a first quantity of same parts 4 in a first measuring machine 20.1 of the plurality of measuring machines 20.1, 20.2;

A2. Measuring a second quantity of same parts 4 in a second machine 20.2 of the plurality of machines 20.1, 20.2;

A3. Performing a comparison process (e.g. by using a comparison module 50). Within the scope of this comparison process,
  a. at least one value of the first quantity is correlated with at least one respective value of the second quantity, and
  b. deviations between the measurement of the first machine 20.1 and measurement of the second machine 20.2 are determined.

The aforementioned comparison process will be explained below in closer detail. It is schematically indicated in FIGS. 2A that both the measuring machine 20.1 and also the measuring machine 20.2 supply values W1, W2 via a communication connection 14.1 and 14.2 to a comparison module 50. The values W1, W2 are correlated in the comparison module 50, as described in the method step A3.a. This correlation is used in order to enable the determination in the method step A3.b. whether there are deviations between the measuring behavior of the first measuring machine 20.1 and the measuring behavior of the second measuring machine 20.2.

Some embodiments concern the automatic recognition of differences in the measurement, determination, performance or behavior of the measuring machines 20.1, 20.2. These differences are referred to here as differences in result.

The determination of differences in result does not concern the comparison of measured values which were determined by the first measuring machine 20.1 on a first same part and by the second measuring machine 20.2 on a second same part. This rather concerns superordinate information on rejects for example (e.g. a reject quote or rate) or statistical information (e.g. maximum of a Gauss distribution over all measured same parts).

In the example of FIG. 2A, the value W1 can indicate for example that three workpieces 4 were rejected for five workpieces 4. This corresponds to a rejection rate of 60%. In the example of FIG. 2A, the value W2 would indicate that there was a rejection of one workpiece 4 in the case of five workpieces 4. This corresponds to a rejection rate of 20%. The comparison module 50 is implemented in such a way that the two values W1, W2 are correlated within the scope of the comparison process for example. In the present case, the two values W1 and W2 clearly differ from each other, i.e., the measuring machines 20.1, 20.2 show distinct differences in the result. In this case, the comparison module 50 can make an output for example, which is designated here with AUS. This output AUS can be transmitted to a superordinate system (e.g., a process or production control).

The statement can now be made with respect to the entire apparatus 200 of FIG. 2A that the upper handling group (apparatus 100.1) has a distinct higher rejection rate than the bottom handling group (apparatus 100.2). It is not possible without any further evaluation to say whether this is caused by the measuring machine 20.1 or machine 10.1.

On the basis of the embodiment of FIG. 2B, a further example will be explained below. In FIG. 2B, the entire apparatus 200 has no direct assignment between the three machines 10.1, 10.2, 10.3 and the two measuring machines 20.1, 20.2. The three machines 10.1, 10.2, 10.3 produce/machine the workpieces 4 and transfer them to an intermediate storage unit 15. The transfer to the intermediate storage unit 15 occurs in this case along so-called handling paths 16 (by using robots or conveying systems for example). The same parts 4 are transferred to the two measuring machines 20.1, 20.2, as shown by reference to the handling paths 17 (e.g. by using robots or conveying systems).

There are (at least) two possibilities in an embodiment according to FIG. 2B. The same parts 4 can no longer be assigned to the machines 10.1, 10.2, 10.3 or they can be assigned to the machines 10.1, 10.2, 10.3 as a result of identifiers. It can also be assumed in the first approach that the assignment of the same parts 4 to the measuring machines 20.1, 20.2 is random, because the same parts 4 are assigned randomly from the intermediate storage unit 15 to the machines 10.1, 10.2, 10.3 depending on the free capacities in the measuring machines 20.1, 20.2. If, on the other hand, an assignment is made on the basis of an identification of the same parts 4, more concrete statements can be made.

The aforementioned comparison process will be explained below in closer detail. It is schematically indicated in FIG. 2B that both the measuring machine 20.1 and also the measuring machine 20.2 supply the values W1, W2 via a communication connection 14.1 and 14.2 to a comparison module 50. The values W1, W2 are correlated in the comparison module 50, as described in the method step A3.a. This correlation is used to allow determining in the method step A3.b. whether or not there are deviations between the measuring behavior of the first measuring machine 20.1 and the measuring behavior of the second measuring machine 20.2.

In the example of FIG. 2B, the value W1 can indicate, for example, that in a number of five workpieces 4 there was a rejection of three workpieces 4. This corresponds to a rejection rate of 60%. In the example of FIG. 2B, the value W2 would indicate that in a number of five workpieces 4 there was a rejection of one workpiece 4. This corresponds to a rejection rate of 20%. The comparison module 50 is implemented in such a way that the two values W1, W2 are correlated for example within the scope of the comparison process. In this case, too, the two values W1 and W2 distinctly deviate from each other, i.e., the measuring machines 20.1, 20.2 show distinct differences in the result. In this case, the comparison module 50 can make an output for example which is designated here with AUS. This output AUS can be transferred to another system for example (e.g. a central computer) or any other process of the entire apparatus 200.

The statement can now be made in the entire apparatus 200 of FIG. 2B that the upper measuring machine 20.1 has a distinctly higher rejection rate than the bottom measuring machine 20.2.

Figure 3:
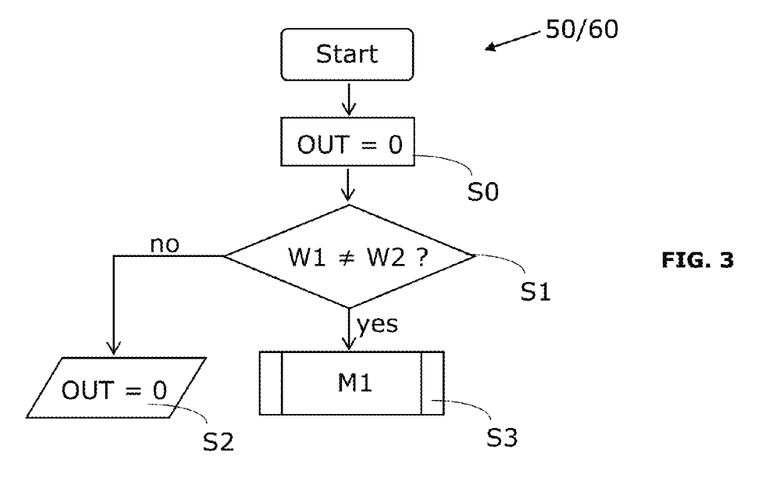
FIG. 3 shows a schematic flowchart which represents relevant steps of a method in accordance with embodiments of the invention.

A rule-based decision-making process 60 is implemented in the comparison module 50 (in hardware and/or software). In the case of the schematic example of FIGS. 2A, 2B, the decision-making process 60 could be provided in a way as shown in FIGS. 3 and 4 on the basis of simple flowcharts.

The decision-making process 60 can be triggered for example when two corresponding values W1, W2 are made available via the lines 14.1, 14.2. All parameters can be set to zero in an initialization step S0. AUS=0 is set here. A comparison is made in a first step S1 whether the values W1 and W2 differ at all. If the two values are identical (i.e., if W1=W2), the decision-making process 60 branches to the left and step S2 is carried out. The output AUS can be set to AUS=0 in step S2 for example. An output AUS=0 can be interpreted for other systems/processes of the entire apparatus 200 in such a way that everything is in order (the rejection rate of both handling groups is equal). If it is determined in step S1 that W1 differs from W2, a subprocess or a submodule M1 can be used in step S3.

Figure 4:
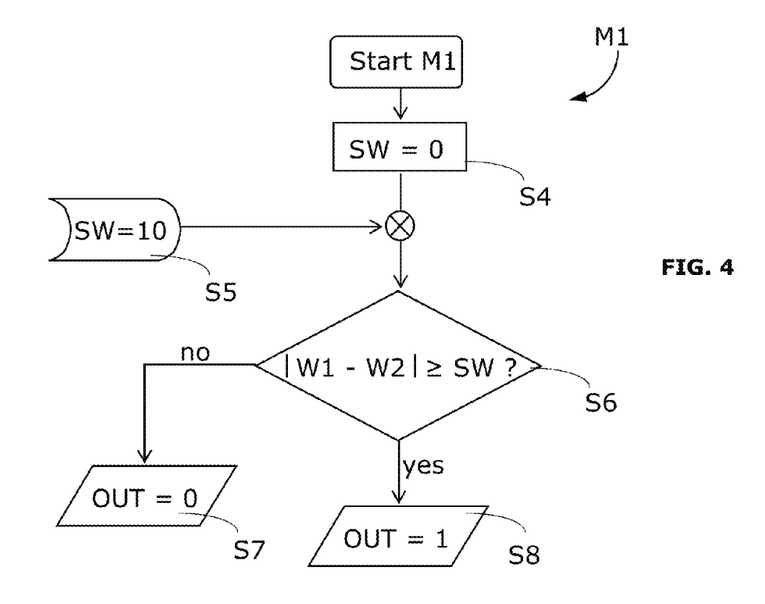
FIG. 4 shows a schematic flowchart which represents illustrative steps of a sub-process of embodiments of the invention.

Exemplary details concerning a subprocess or submodule M1 are shown in FIG. 4. All parameters can be set to zero in an initialization step 4. SW=0 is set here. SW is a threshold value. In a step S5, the currently used threshold value SW can be taken from a memory. Said threshold value SW is used to make the decision-making process 60 insensitive to the normal fluctuations caused by the system. In the illustrated example, the threshold value SW=10 is predetermined. It is now determined in step S6 whether the amount of the difference of W1 and W2 is greater than or equal to the threshold value SW. If the two values W1, W2 differ only slightly, the decision-making process 60 branches to the left and the step S7 is carried out. The output AUS can be set to AUS=0 in the step S7 (as in step S2). Otherwise, step S8 follows, which leads to the consequence in this case that the output AUS is set to the value 1. An output AUS=1 can be interpreted for other systems/processes of the entire apparatus 200 in such a way for example that a state has occurred which requires (counter) measures or triggers a reaction. If AUS=1, there are so-called differences in the result.

The comparison process is carried out in such a way that not only differences in the results are detected but that the presence of a difference in results can also be assigned to one of the machines 20.1 or 20.2. In the aforementioned example, it could be determined in a subprocess or submodule for example whether the value W1 is greater with respect to its amount than the value W2.

It is indicated in FIG. 2A on the left that the comparison module 50 can be connected by way of communication to another system or process of the entire apparatus 200 in order to enable the triggering or performance of (counter) measures as a reaction for example if the output is AUS=1. In the case of FIG. 2B, the output AUS=1 can be transferred to a master system in order to trigger or perform (counter) measures as a reaction for example. These statements should only be understood as examples.

An output signal AUS was selected in connection with the examples described herein which can only assume the two states of zero or one. The output AUS, which is output by the comparison module 50 and/or the comparison process, can also be distinctly more complex.

There are numerous possibilities to form the decision-making process 60. A rule-based decision-making process 60 may be used. The rules of such a rule-based decision-making process 60 can be predetermined, or they can be adjustable. This adjustment of the rules can be limited to the determination of rules (the user can determine the threshold value SW for example), or software can be provided which allows the user to adjust the rules or define own rules. It is also possible to provide a library with rules that allows the user to select and use predefined decision-making processes 60.

The decision-making process 60, as shown by way of example in FIGS. 3 and 4, can also be formed in a distinctly more complex manner. This depends to a higher extent on the requirement profile of the machine user. A number of examples are described below.

If it is intended to temporarily remove a gear-measuring machine 20 (e.g., the machine 20.1 in FIG. 2B because this machine 20.1 produces too many rejects) from production when it produces too many rejects, the comparison module 50 or the comparison process can either perform a comparison with an absolute fixed value which is or will be predetermined. The question in step S6 can be the following, for example: if W1>5% or W2>5%, then trigger the removal from production of the respective measuring machine 20.1 or 20.2. Or a relative comparison can be carried out, as described in connection with FIGS. 3 and 4. Such a relative comparison of several measuring machines 20.1, 20.2 of the same type offers the advantage that it is less strict. It can occur for example that as a result of ambient conditions (e.g., as a result of high humidity) all gear-measuring machines 20.1, 20.2 show a slightly higher rejection rate than usual. In this case, the production and the measurement (steps A1 and A2) can be continued, because experience has shown that this measuring behavior is normal.

If one wishes to carry out statistical evaluations (e.g., for preparing probability plots, for displaying measurement functions or histograms), every gear-measuring machine 20.1 and 20.2 can individually carry out computational evaluations and/or computational evaluations can be carried out by a superordinate module or by a superordinate system/process. The result of these computational evaluations can be supplied to the comparison module 50 again (similar to the illustration shown in FIG. 2A). In this case, so-called metadata are concerned which are correlated and compared. The value W1 can represent the value pair of the maximum value of a Gaussian distribution of the measuring machine 20.1, for example, and the value W2 can represent the value pair of the maximum value of a Gaussian distribution of the measuring machine 20.2. In this case, these two value pairs would be brought into correlation with each other. The question in step 6 can now be the following, for example: if W1=28 microradians±1 microradian and if W2=28 microradians±1 microradian, then AUS=0 applies. It is determined in this case within the scope of the rule-based decision-making process 60 whether the maximum of the Gaussian curves of the measuring machines 20.1, 20.2 lie in a range of between 27 microradians and 29 microradians. Absolute evaluation is therefore concerned in this case. In addition, a relative comparison of the two maximums of the Gaussian curves of the measuring machines 20.1, 20.2 can additionally be carried out, for example.

The embodiment of FIG. 2A relates to an entire arrangement 200, in which a processing machine forms a handling group with a gear-measuring machine. In this case, the processing machine 10.1 operates hand-in-hand with the gear-measuring machine 20.1 and the processing machine 10.2 with the gear-measuring machine 20.2. If the comparison process 60 leads to the result that the handling group 10.1, 20.1 (apparatus 100.1) produces a higher rejection rate than the handling group 10.2, 20.2 (apparatus 100.2), conclusions can be drawn for example on a problem of the first handling group 10.1, 20.1 (apparatus 100.1). In order to allow making a statement on whether the problems are caused by the processing machine 10.1 or the gear-measuring machine 20.1, a more precise evaluation of data can be triggered. Within the scope of a more precise evaluation, one of the following steps or several of the following steps can be carried out:

analysis of the temperature behavior of the processing machine 10.1, and/or analysis of the vibration behavior of the processing machine 10.1, and/or analysis of the noise behavior of the processing machine 10.1, and/or analysis of discolorations of the workpieces and/or the metal chips of the processing machine 10.1, and/or repetition of the measurement on workpieces which were sorted out by one of the gear-measuring machines (e.g. 20.1) by the same gear-measuring machine (e.g. 20.1), and/or transfer of workpieces which were sorted out by one of the gear-measuring machines (e.g. 20.1) to another gear-measuring machine (e.g. 20.2) in order to allow comparison measurements to be carried out on these workpieces.

The gear-measuring machines 20 of certain embodiments can concern testing machines for single-flank or double-flank roller testing, of which several can be arranged adjacent to each other at the end of a production line (entire system 200). Deviations in the measurement results can occur for example in such testing machines for the single-flank or double-flank roller testing as a result of setting and chucking errors. Chucking errors can occur for example as a result of wear and tear of chucking apparatuses for the workpiece. Differences can also occur between a first measuring machine 20.1 and a second measuring machine 20.2 of the same type, because they are assembled from machine elements which can slightly differ from each other. Although they are minor, these errors can produce distinct differences in the acceptance or rejection of workpieces when seen over a large number of same parts to be measured.

It can occur, for example, that a number of the same parts are sorted out although they actually fulfill the specifications. This leads to the consequence that such same parts are either completely rejected or that they are reworked, although this would actually not have been necessary. It can also occur, however, that same parts which actually should be sorted out pass the final test. These same parts, which are actually not in conformity, are then installed in a transmission, for example. If this transmission then causes problems, high costs are incurred because vehicles need to be repaired, for example.

As may be recognized by those of ordinary skill in the pertinent art based on the teachings herein, numerous changes and modifications may be made to the above-described and other embodiments of the present invention without departing from the spirit of the invention as defined in the claims. Accordingly, this detailed description of embodiments is to be taken in an illustrative, as opposed to a limiting sense.

What is claimed is:

1. A method for operating a plurality of measuring machines comprising:
   (a) measuring a first quantity of parts in a first measuring machine of the plurality of measuring machines configured to measure said first quantity of parts;
   (b) measuring a second quantity of parts in a second measuring machine of the plurality of measuring machines configured to measure said second quantity of parts and of a same type as the first measuring machine, wherein each of the second quantity of parts is identical to each of the first quantity of parts except for production-induced deviations or tolerances;
   (c) performing a comparison process including
      correlating at least one value of the first quantity of parts with at least one respective value of the second quantity of parts; and
      determining from said correlating step deviations between measurements made by the first measuring machine in step (a) and measurements made by the second measuring machine made in step (b).

2. A method according to claim 1, wherein further comprising automatically triggering a reaction in the event of a deviation between said measurements made by the first measuring machine and said measurements made by the second measuring machine.

3. A method according to claim 1, further comprising triggering a process in the event of a deviation between said measurements made by the first measuring machine and said measurements made the second measuring machine including performing a further comparison between the at least one value of the first quantity of parts with the at least one respective value of the second quantity of parts.

4. A method according to claim 1, further comprising influencing with a superordinate apparatus one or more of the first measuring machine or the second measuring machine in the event of a deviation between said measurements made by the first measuring machine and said measurements made by the second measuring machine.

5. A method according to claim 2, wherein the comparison process includes performing a rule-based decision-making process.

6. A method according to claim 3, wherein the comparison process includes performing a rule-based decision-making process.

7. A method according to claim 4, wherein the comparison process includes performing a rule-based decision-making process.

8. A method according to claim 1, wherein the at least one value of the first quantity of parts and the at least one respective value of the second quantity of parts include one or more of statistical values or metadata which characterize the measurement behavior of the first measuring machine and the second measuring machine.

9. A method according to claim 1, wherein the plurality of measuring machines comprise gear-measuring machines.

10. An apparatus comprising:
    at least one first gear-measuring machine configured to measure a first quantity of parts; and
    a second gear-measuring machine configured to measure a second quantity of parts, wherein each of the second quantity of parts is identical to each of the first quantity of parts except for production-induced deviations or tolerances;
    wherein the at least one first gear-measuring machine and the second gear-measuring machine comprise measuring machines of a same type, and the apparatus includes a comparison module connectable by communication technology to the at least one first gear-measuring machine and the second gear-measuring machine, and configured to perform a comparison process including correlating at least one value of the first quantity of parts with at least one respective value of the second quantity of parts, and determining from said correlating step deviations between measurements made by the at least one first gear-measuring machine and measurements made by the second gear-measuring machine.

11. An apparatus according to claim 10, wherein the comparison module is in communication connection with the at least one first gear-measuring machine and the second gear-measuring machine and is configured to perform the comparison process.

12. An apparatus according to claim 10, wherein the at least one first gear-measuring machine comprises a first controller and the second gear-measuring machine comprises a second controller, and one or more of the comparison module or the comparison process is located in the first controller or in the second controller.

13. An apparatus according to claim 11, wherein the comparison process includes a rule-based decision-making process.

14. An apparatus according to claim 12, wherein the comparison process includes a rule-based decision-making process.

* * * * *